United States Patent [19]

Nagashima et al.

[11] Patent Number: 5,236,692
[45] Date of Patent: Aug. 17, 1993

[54] METHOD FOR PRODUCING HYDROGEN PEROXIDE

[75] Inventors: Hiromitsu Nagashima, Matsudo; Yukio Ishiuchi, Ushiku; Yasushi Hiramatsu, Tokyo, all of Japan

[73] Assignee: Mitsubishi Gas Chemical Company, Inc., Tokyo, Japan

[21] Appl. No.: 853,421

[22] Filed: Mar. 18, 1992

[30] Foreign Application Priority Data

Mar. 20, 1991 [JP] Japan .................................. 3-081907

[51] Int. Cl.$^5$ .............................................. C01B 15/01
[52] U.S. Cl. ..................................................... 423/584
[58] Field of Search ......................................... 423/584

[56] References Cited

U.S. PATENT DOCUMENTS

| | | |
|---|---|---|
| 4,007,256 | 2/1977 | Kim et al. ............................ 423/584 |
| 4,009,252 | 2/1977 | Izumi et al. .......................... 423/584 |
| 4,279,883 | 7/1981 | Izumi et al. .......................... 423/584 |
| 4,379,778 | 4/1983 | Dalton, Jr. et al. ................. 423/584 |
| 4,992,402 | 2/1991 | Schweizer . |

FOREIGN PATENT DOCUMENTS 0049810 4/1982 European Pat. Off. .
0274830 7/1988 European Pat. Off. .

OTHER PUBLICATIONS

World Patents Index Latest, Derwent Pub. Ltd., JP-A-2 056 250, Feb. 26, 1990.
World Patents Index Latest, Derwent Pub. Ltd., JP-A-2 142 739, May 31, 1990.
Patent Abstracts of Japan, vol. 015, No. 259 (C-0846) Jul. 2, 1991, JP-A-3 086 237.

*Primary Examiner*—Wayne Langel
*Attorney, Agent, or Firm*—Wenderoth, Lind & Ponack

[57] ABSTRACT

A method for producing a high concentration of hydrogen peroxide by reacting oxygen and hydrogen directly in a reaction medium containing a promoter such as a halogen containing compound using a platinum group metal catalyst supported on a solid acid carrier or a solid super acid carrier.

14 Claims, No Drawings

METHOD FOR PRODUCING HYDROGEN PEROXIDE

FIELD OF UTILIZATION IN INDUSTRY

The present invention relates to an improved method for producing hydrogen peroxide by reacting oxygen and hydrogen directly in the reaction medium in the presence of a catalyst. More specifically, it is a method for producing hydrogen peroxide by reacting oxygen and hydrogen directly in the presence of a platinum group metal catalyst supported on a solid super acid carrier or a solid acid carrier in a reaction medium containing a promoter.

DESCRIPTION OF THE PRIOR ART

The main method presently used by industry for producing hydrogen peroxide is the auto oxidation method using alkyl-anthraquinone as the medium. The fact that the processes of reduction, oxidation, extraction, purification, and concentration are very complex and the fact that equipment and operations costs are large are given as the problem points of this method. Additionally, there are loss due to degeneration of alkyl-anthraquinone and problems of the deactivation of the hydrogenation catalyst.

Several production methods other than the above method have been attempted in order to remedy these problems. One of these is a method for producing hydrogen peroxide directly from oxygen and hydrogen using a catalyst in the reaction medium. Already, methods for producing hydrogen peroxide from hydrogen and oxygen and using platinum group metals as catalysts have been proposed, and the production of moderate concentrations of hydrogen peroxide has been described (Japanese Patent Publication No. 47121/1981, Japanese Patent Publication No. 18646/1980, Japanese Patent Publication No. 23401/1989, and Japanese Laid Open Patent Application No. 156005/1988). All of these use aqueous solutions as the reaction medium. However, acid and inorganic salts are dissolved in these aqueous reaction media. In particular, due to the presence of halogen ions in the reaction medium, catalytic activity is inhibited, the selectivity of hydrogen peroxide production is increased, and a high concentration of hydrogen peroxide is obtained. Japanese Laid Open Patent Application No. 156005/1988 shows that the selective production of a high concentration of hydrogen peroxide due to the presence of a halogen ion such as bromine ion in the reaction medium in a method for using a platinum group catalyst to produce a high concentration of hydrogen peroxide from hydrogen and oxygen under elevated pressure in an acidic aqueous solution is possible.

Additionally, the inventors of the present invention have applied for a patent for a method of producing hydrogen peroxide by direct reaction of oxygen and hydrogen in the presence of a platinum group metal catalyst supported on a halogenated resin carrier in a reaction medium which does not contain halogen ion (U.S. Ser. No. 07/763,166), and, further, have applied for a patent for a method of producing hydrogen peroxide by direct reaction of oxygen and hydrogen in the presence of a catalyst comprising a metallic or carrier supported platinum group metal catalyst onto which an organic halogen compound which is insoluble in water has been adsorbed or a platinum group metal catalyst supported on a carrier in which a halogenated organic compound which is insoluble in water has been adsorbed to the carrier prior to supporting the platinum group metal in a reaction medium which does not contain halogen ion (U.S. Ser. No. 07/811,035).

PROBLEMS THE PRESENT INVENTION AIMS TO SOLVE

Practically speaking, in prior art methods for the production of hydrogen peroxide by the catalytic reaction of oxygen and hydrogen in the reaction medium, it is necessary for there to be a high concentration of acid and halogen ion present in the reaction medium in order to obtain a high concentration of hydrogen peroxide. In this case, together with the fact that the structural materials for equipment that can be used in applications where high concentration acid solutions can be used in the presence of halogen ion as the reaction medium are limited, there is also the problem of the dissolution of the catalyst into the acidic solution. This dissolution of the catalyst reduces the catalyst's activity and decreases its life. Moreover, regarding the catalyst metal dissolved into the acidic solution, there are also serious problems in that, in addition to the reduction in quality of the hydrogen peroxide produced, such low concentrations of dissolved metal are extremely difficult to reclaim by recycling methods. Consequently, in the prior art, reaction vessels made of structural materials with high corrosion resistance are required, and there is also an economic problem with regard to the necessity of post production treatment for the removal of highly concentrated acid and halogen ion.

MEANS FOR SOLVING THE PROBLEMS

The inventors of the present invention have discovered as a result of continuing investigations into a production method for obtaining hydrogen peroxide in high concentration using a neutral reaction medium which does not contain acid, in a method for producing hydrogen peroxide directly from oxygen and hydrogen using a catalyst, that it is possible to achieve the above objectives using an oxide that is a solid acid as the carrier of a catalyst which has a platinum group element as its active component, and, additionally, that by using a solid acid that is a super acid (also called a "solid super acid") which is particularly super acidic even among solid acids, the effectiveness is even more marked.

The primary objective of this invention is to offer a method for producing hydrogen peroxide in which it is possible to obtain hydrogen peroxide in high concentration by reacting oxygen and hydrogen directly in the presence of a catalyst in a neutral aqueous reaction medium that does not contain acid. The second objective of the present invention is to offer a method for the production of hydrogen peroxide in which, because there is no acid present in the reaction medium, there is no need for a procedure to remove acid from the hydrogen peroxide obtained, and, accordingly, the procedure for purifying the hydrogen peroxide obtained is simplified relative to the prior art. The third objective of the present invention is to offer a novel method for the production of hydrogen peroxide which makes possible the commercial production of hydrogen peroxide by the direct reaction of oxygen and hydrogen in the presence of a catalyst.

Solid super acids, which are one type of solid acid and which can be used as the carrier of the catalyst in the present invention, are solids exhibiting surface acidity and, more specifically, are solid acids that exhibit stronger acidity (Acidity index: $Ho < -11.0$ to $-11.9$) than 100% sulfuric acid as can be confirmed by the color of adsorbed indicators or by the adsorption of bases. As the solid super acid used as the catalyst carrier of the present invention, a solid super acid in which sulfuric acid is supported on a metal oxide or a solid super acid consisting of metal oxides may be used.

Concretely, the solid super acid in which sulfuric acid is supported on a metal oxide may be a solid super acid in which sulfuric acid is supported on zirconia, titania, alumina or the like. It can be obtained by adding 0.05 to 0.5 mole/liter sulfuric acid to the hydroxide of zirconium, titanium, aluminum or the like, mixing evenly, and, after drying, calcining the mixture at between 200° C. and 800° C. and preferably at between 400° C. and 600° C. The solid super acid consisting of metal oxides includes molybdenum oxide supported on zirconia and tungsten oxide supported on zirconia and may be obtained by calcining zirconia with, depending upon the method of impregnating the non-zirconia metal oxide or the coprecipitation method, an amount of molybdenum oxide or tungsten oxide equal to between 0.1% and 50% by weight of the zirconia and preferably between 1% and 30% by weight of the zirconia at a temperature of between 200° C. and 1000° C. and preferably between 600° C. and 800° C..

The form of the catalyst carrier in the case where a solid super acid is used may be voluntarily selected from among microfine powder, grains or pellets. Since with regard to the solid super acid in which sulfuric acid is supported on a metal oxide, there can be a problem of the dissolution of sulfate ion out of the carrier if the carrier is placed in a reducing environment for long periods of time, the use of a solid super acid consisting of metal oxides is preferred in this reaction. Also, although such solid acids as the proton form of Type MFI zeolite or the proton form of mordenite (Acidity index: $-12 < Ho < -3$), which is high silica zeolite in which the silicon to aluminum ratio (Si/Al) in the crystal structure is greater than 3, are not solid super acids, by using them it is possible to produce hydrogen peroxide with good selectivity in a reaction medium that does not contain acid. That is to say, the solid acids used as carriers in the present invention are solid acids that show an acidity index with a value of less than $-3$ ($Ho < -3$) and, preferably, solid super acids which exhibit a value of $Ho < -11.0$ to $-11.9$. In the case where a solid acid is used as the carrier, the form is not particularly restricted, and grains or pellets may be freely selected.

On the other hand, when such substances as alumina-magnesia, magnesia or carbon, which do not exhibit solid acidity, are used as the carrier, it is impossible to obtain hydrogen selectivity of the present invention under the same reaction conditions as are used in the present invention.

The catalyst of the present invention is prepared by supporting the active part of the catalyst, which is mainly a platinum group element, on a carrier composed of one of the aforementioned solid acids or solid super acids. As the platinum group metal used in the present invention, concretely, palladium and platinum may be used either singly or in alloys or mixtures. In addition, it is also possible using primarily platinum and/or palladium to include ruthenium, osmium, rhodium or iridium as components of an alloy or mixture. Preferably palladium or platinum are used, and palladium is particularly preferred. The amount of these catalyst active component metals supported on the carrier is between 0.1% and 10% by weight. Also, for the method of supporting the platinum group metal on the solid acid carrier or the solid super acid carrier, such prior art methods as impregnation may be used. The amount of the platinum group metal catalyst of the present invention used to produce hydrogen peroxide from oxygen and hydrogen is between 1 gram and 200 grams per liter and preferably between 5 grams and 50 grams per liter of the reaction medium.

As the reaction medium containing the promoter used in the present invention, various neutral aqueous solutions containing such promoters from the prior art as halogen containing compounds (except for compounds containing no halogen other than fluorine) or such amino acid compounds as norleucine may be used. As the promoter, halogen containing compounds are preferable, and, as the halogen containing compound, such chlorine compounds as sodium chloride, potassium chloride, ammonium chloride; such bromine compounds as sodium bromate, sodium bromide, potassium bromide, ammonium bromide, and hydrobromic acid and such iodine compounds as sodium iodide, potassium iodide, and ammonium iodide may be used. However, sodium bromate, sodium bromide, potassium bromide, ammonium bromide and ammonium chloride are preferred. In addition, such substances as hydrochloric acid and hydrobromic acid may be used, although, in such a case, the aqueous solution used as the reaction medium becomes acidic. However, even in this kind of acidic aqueous solution, the catalyst, which has been prepared using the carrier of the present invention, provides superior results. Moreover, the addition of prior art stabilizers that prevent the decomposition of hydrogen peroxide, for example, ethylenediamine tetra(methylenephosphonic acid) is permissible. As hydrogen peroxide stabilizers, in addition to the aforementioned compound, aminotri(methylenephosphonic acid), 1-hydroxyethylidene-1, 1-diphosphonic acid, the sodium salts of the preceding or sodium pyrophosphate are preferred.

The amount of the promoter depends upon the amount of the catalyst used. Normally, more than 0.001 millimoles per liter of reaction medium are used, and preferably more than 0.1 millimoles per liter of reaction medium are used. There is no particular maximum amount of promoter that may be used. However, even if a large excess is added, no corresponding increase in effectiveness is obtained. The amount of promoter used is determined on a case by case basis by optimization according to the amount of catalyst and type of promoter.

The production of hydrogen peroxide in the present invention is carried out by bringing oxygen and hydrogen together in the reaction medium either in the presence or the absence of an inert gas such as nitrogen which will not impede the progress of the reaction under a reaction pressure of between 3 kg./cm$^2$.G and 150 kg./cm$^2$.G, a reaction temperature of between 0° C. and 50° C. and a reaction time of between 30 minutes and 6 hours.

EXAMPLES

The present invention is explained below in more detail by Examples and Comparative Experiments. The gas composition values used in the Examples are gas chromatography values. The measurement of hydrogen peroxide concentration in the reaction medium was performed by titration using sulfuric acid - potassium permanganate.

Example 1

The preparation of the catalyst carrier was performed as explained below. To 61.4 grams of commercially available zirconium hydroxide (manufactured by Mitsuwa Chemical Company) an aqueous solution of 3.1 grams of commercially available ammonium molybdate (manufactured by Koso Chemical Company, Ltd.) completely dissolved in pure water was added, and the ammonium molybdate was supported by impregnating it into the zirconium hydroxide so that the amount of molybdenum oxide was equal to 5% of the weight of the zirconium oxide. After the ammonium molybdate impregnated zirconium hydroxide was dried for 24 hours in a dryer at 110° C., it was calcined for 3 hours at 600° C. under atmosphere, and 50 grams of a solid super acid in which molybdenum oxide was supported on zirconia (Acidity index:(Ho) was essentially the same as for the tungsten oxide supported on zirconia) was obtained. By the impregnation method, an aqueous solution of palladium nitrate was added to and supported on the solid super acid carrier obtained above so that the amount of palladium was 1% by weight of the carrier, and after calcining this palladium nitrate impregnated carrier for 2 hours at 400° C. under a stream of air, it was reduced at 200° C. under a flow of hydrogen gas for one hour to obtain the catalyst.

The reaction to produce hydrogen peroxide from oxygen and hydrogen was carried out as follows. Into a glass vessel with a capacity of 65 ml. was added 10 grams of an aqueous solution containing 0.5 millimoles per liter of sodium bromate. To this solution was added 50 mg. of the supported palladium catalyst prepared above, and the glass vessel was placed inside a 100 ml. capacity autoclave. After exchanging the air in the autoclave with a gaseous mixture consisting by volume of 4% hydrogen gas, 40% oxygen gas and 56% nitrogen gas, this same gaseous mixture was added to the autoclave until the pressure was raised to 50 kg./cm$^2$ . G. The reaction was stirred for one hour at 10° C. and 2000 rpm. Upon the cessation of stirring after one hour, the concentration of hydrogen peroxide produced in the reaction mixture was 0.97% by weight of the reaction mixture, and the hydrogen selectivity was 84%. The hydrogen selectivity was calculated as follows.

Hydrogen selectivity (%)=((the amount of hydrogen peroxide produced by the reaction in moles)÷(the amount of hydrogen peroxide theoretically produced calculated from the amount of hydrogen consumed in moles.))×100.

In addition, the results of measuring the concentration of palladium in the reaction mixture after the reaction by inductively coupled plasma spectroscopy using an SPS 1200 VR type spectrophotometer made by Seiko Instruments Inc. after separating the catalyst from the reaction mixture by filtration, were 0.0 ppm. palladium.

EXAMPLE 2

Except for the use as the catalyst carrier of a solid super acid composed of tungsten oxide supported on zirconia (Ho≦ −14.52) prepared by adding a solution of 2.8 grams of commercially available ammonium tungstate (Koso Chemical Company, Ltd.) completely dissolved in pure water to 61.4 grams of commercially available zirconium hydroxide (Mitsuwa Chemical Company) and thereby impregnating and supporting the ammonium tungstate on the zirconium hydroxide so that the amount of tungsten oxide was equal to 5% of the weight of the zirconium oxide, drying the substance thus obtained in a dryer for 24 hours at 110° C. and calcining it at 600° C. for 3 hours under atmosphere, the catalyst preparation and hydrogen peroxide production reaction were performed under the same conditions as in Example 1. Upon the cessation of stirring after one hour, the concentration of hydrogen peroxide produced in the reaction mixture was 1.06% by weight of the reaction mixture, and the hydrogen selectivity was 99%. In addition, the results of measuring the concentration of palladium in the reaction mixture after the reaction by inductively coupled plasma spectroscopy using an SPS 1200 VR type spectrophotometer made by Seiko Instruments Inc. after separating the catalyst from the reaction mixture by filtration, were 0.1 ppm. palladium.

COMPARATIVE EXAMPLE 1

Except for the use of commercially available silicon dioxide (manufactured by Mizusawa Industrial Chemicals, Ltd.) as the catalyst carrier and the use of 10 grams of an aqueous solution of 0.1 moles per liter of sulfuric acid and 0.5 millimoles per liter of sodium bromate in place of 10 grams of an aqueous solution containing 0.5 millimoles per liter of sodium bromate as the reaction medium, the catalyst preparation and hydrogen peroxide production reaction were performed under the same conditions as in Example 1. Upon the cessation of stirring after one hour, the concentration of hydrogen peroxide produced in the reaction mixture was 0.97% by weight of the reaction mixture, and the hydrogen selectivity was 90%. In addition, the results of measuring the concentration of palladium in the reaction mixture after the reaction by inductively coupled plasma spectroscopy using an SPS 1200 VR type spectrophotometer made by Seiko Instruments Inc. after separating the catalyst from the reaction mixture by filtration, were 1.5 ppm. palladium. It can clearly be understood from this that by comparison with the results of Example 1 and Example 2, the use of sulfuric acid and sodium bromate according to the prior art results in a much larger dissolution of palladium into the solution.

EXAMPLE 3

Except for the use of the substance obtained by calcining the solid super acid in which molybdenum oxide was supported on zirconia of Example 1 under atmosphere at 800° C. for 3 hours as the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.78% by weight of the reaction mixture, and the hydrogen selectivity was 80%.

EXAMPLE 4

Except for the use of the substance obtained by calcining the solid super acid in which tungsten oxide was supported on zirconia of Example 2 under atmosphere at 800° C. for 3 hours as the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.77% by weight of the reaction mixture, and the hydrogen selectivity was 72%.

EXAMPLE 5

The preparation of the catalyst carrier was carried out by the following method. To 2 grams of commercially available zirconium hydroxide (manufactured by Mitsuwa Chemical Company) on filter paper was added 30 ml. of an aqueous solution of 0.5 moles per liter of sulfuric acid. After air drying, the mixture was further dried for 24 hours in a dryer at 110° C. and calcined for 3 hours at 600° C. under atmosphere, and a solid super acid carrier in which sulfuric acid was supported on zirconia (Ho ≦ −16.04) was obtained. Except for the use of the carrier obtained above, the catalyst preparation and hydrogen peroxide production reaction were performed under the same conditions as in Example 1. Upon the cessation of stirring after one hour, the concentration of hydrogen peroxide produced in the reaction mixture was 0.25% by weight of the reaction mixture, and the hydrogen selectivity was 67%.

EXAMPLE 6

Except for the use of 10 grams of an aqueous solution of 0.2 moles per liter of ammonium chloride in place of 10 grams of a aqueous solution of 0.5 millimoles per liter of sodium bromate as the reaction medium, the catalyst preparation and hydrogen peroxide production reaction were performed under the same conditions as in Example 2. Upon the cessation of stirring after one hour, the concentration of hydrogen peroxide produced in the reaction mixture was 0.70% by weight of the reaction mixture, and the hydrogen selectivity was 61%.

EXAMPLE 7

Except for the use of a catalyst in which platinum was supported in an amount equal to 0.5% by weight of the catalyst carrier by impregnating the solid super acid carrier in which molybdenum oxide was supported on zirconia used in Example 1 with hexachloroplatinic acid using the same method as in Example 1, and except for the use of 10 grams of an aqueous solution of 0.5 millimoles per liter of potassium iodide in place of 10 grams of an aqueous solution of 0.5 millimoles per liter of sodium bromate as the reaction medium, the catalyst preparation and hydrogen peroxide production reaction were performed under the same conditions as in Example 1. Upon the cessation of stirring after one hour, the concentration of hydrogen peroxide produced in the reaction mixture was 0.58% by weight of the reaction mixture, and the hydrogen selectivity was 48%.

EXAMPLE 8

Except for the use of the proton form of mordenite (Si/Al = 18, Ho < −5.6) as the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.64% by weight of the reaction mixture, and the hydrogen selectivity was 38%.

EXAMPLE 9

Except for the use of the proton form of Type MFI zeolite (Si/Al = 15, Ho < −5.6) as the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.49% by weight of the reaction mixture, and the hydrogen selectivity was 46%.

COMPARATIVE EXPERIMENT 2

For the preparation of the catalyst carrier, the impregnation method was used as follows. To 17 grams of a commercially available aluminum oxide (manufactured by Kanto Chemical Company, Inc.) was added a separately prepared solution of 19.1 grams of commercially available magnesium nitrate (manufactured by Kanto Chemical Company, Inc.) completely dissolved in pure water so that the ratio of alumina to magnesia was equal to 85:15. After stirring for two hours, the mixture was evaporated to dryness on a hot plate, further dried for 24 hours in a dryer at 110° C. and calcined for 2 hours at 500° C. under a stream of air to obtain 20 grams of a catalyst carrier. Except for the use of the carrier obtained above, the catalyst preparation and hydrogen peroxide production reaction were performed under the same conditions as in Example 1. Upon the cessation of stirring after one hour, the concentration of hydrogen peroxide produced in the reaction mixture was 0.01% by weight of the reaction mixture, and the hydrogen selectivity was 2%.

COMPARATIVE EXPERIMENT 3

Except for the use of commercially available magnesium oxide (manufactured by Kanto Chemical Company, Inc.) as the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.00% by weight of the reaction mixture, and the hydrogen selectivity was 0%.

COMPARATIVE EXPERIMENT 4

Except for the use of 21 mg. of a carbon powder supported 5% by weight palladium catalyst (product of N. E. Chemcat Corporation: water content 52.24%) as the catalyst, the hydrogen peroxide production reaction was performed under the same conditions as in Example 1. Upon the cessation of stirring after one hour, the concentration of hydrogen peroxide produced in the reaction mixture was 0.02% by weight of the reaction mixture, and the hydrogen selectivity was 1%.

COMPARATIVE EXPERIMENT 5

Except for the use of the proton form of Type A zeolite (Si/Al = 1, −3.0 < Ho < 3.3) as the catalyst carrier, the catalyst preparation and hydrogen peroxide production reaction were performed under the same conditions as in Example 1. Upon the cessation Of stirring after one hour, the concentration of hydrogen peroxide produced in the reaction mixture was 0.15% by weight of the reaction mixture, and the hydrogen selectivity was 18%.

COMPARATIVE EXPERIMENT 6

Except for the use of the sodium form of mordenite (Si/Al = 18, −3.0 < Ho < 3.3) as the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.08% by weight of the reaction mixture, and the hydrogen selectivity was 5%.

COMPARATIVE EXPERIMENT 7

Except for the use of the sodium form of Type MFI zeolite (Si/Al=15, $-3.0<Ho<3.3$) as the catalyst carrier, the catalyst preparation and hydrogen peroxide production reaction were performed under the same conditions as in Example 1. Upon the cessation of stirring after one hour, the concentration of hydrogen peroxide produced in the reaction mixture was 0.10% by weight of the reaction mixture, and the hydrogen selectivity was 8%.

EXAMPLE 10

Except for the use of 10 grams of an aqueous solution of 75 ppm. of ethylenediaminetetra(methylene phosphonic acid) and 0.5 millimoles per liter of sodium bromate in place of 10 grams of an aqueous solution of 0.5 millimoles per liter of sodium bromate as the reaction medium, the catalyst preparation and hydrogen peroxide production reaction were performed under the same conditions as in Example 2. Upon the cessation of stirring after one hour, the concentration of hydrogen peroxide produced in the reaction mixture was 1.04% by weight of the reaction mixture, and the hydrogen selectivity was 90%.

EXAMPLE 11

Except for the use of 10 grams of an aqueous solution of 60 ppm. of sodium pyrophosphate and 0.5 millimoles per liter of sodium bromate in place of 10 grams of an aqueous solution of 0.5 millimoles per liter of sodium bromate as the reaction medium, the catalyst preparation and hydrogen peroxide production reaction were performed under the same conditions as in Example 1. Upon the cessation of stirring after one hour, the concentration of hydrogen peroxide produced in the reaction mixture was 0.98% by weight of the reaction mixture, and the hydrogen selectivity was 87%.

EXAMPLE 12

Except for the use of 10 grams of an aqueous solution of 0.1 millimoles per liter of sodium bromide in place of 10 grams of an aqueous solution of 0.5 millimoles per liter of sodium bromate as the reaction medium, the catalyst preparation and hydrogen peroxide production reaction were performed under the same conditions as in Example 2. Upon the cessation of stirring after one hour, the concentration of hydrogen peroxide produced in the reaction mixture was 0.78% by weight of the reaction mixture, and the hydrogen selectivity was 89%.

COMPARATIVE EXPERIMENT 8

Except for the use of 10 grams of an aqueous solution of 50 millimoles per liter of ammonium fluoride in place of 10 grams of an aqueous solution of 0.5 millimoles per liter of sodium bromate as the reaction medium, the catalyst preparation and hydrogen peroxide production reaction were performed under the same conditions as in Example 1. Upon the cessation of stirring after one hour, the concentration of hydrogen peroxide produced in the reaction mixture was 0.00% by weight of the reaction mixture, and the hydrogen selectivity was 0%.

EFFECTS OF THE PRESENT INVENTION

Compared with the Comparative Experiments, the concentration of hydrogen peroxide obtained and the hydrogen selectivity observed in the Examples were very high. It is possible to selectively produce high concentrations of hydrogen peroxide using the platinum group metal catalyst of the present invention even where the reaction medium contains no acid. Thus, since there is no necessity for the reaction medium to contain a high concentration of acid in the present invention, it is possible to reduce the problem of the dissolution into the reaction medium of the catalyst and the problem of corrosion of the reaction vessel structural materials.

What we claim is:

1. A method for producing hydrogen peroxide by reacting oxygen and hydrogen directly in a neutral reaction medium containing a promoter in the presence of a platinum group catalyst wherein a platinum group metal is supported on a solid acid carrier with an acidity index of $Ho<-3$ or a solid super acid carrier with an acidity index of $Ho<-11$.

2. A production method for hydrogen peroxide according to claim 1 wherein the platinum group metal is palladium or platinum.

3. A production method for hydrogen peroxide according to claim 1 wherein a solid super acid carrier is employed, which a solid super acid in which sulfuric acid is supported on a metal oxide or a solid super acid consisting of metal oxides.

4. A production method for hydrogen peroxide according to claim 3 wherein the solid super acid in which sulfuric acid is supported on a metal oxide of claim 3 is a solid super acid in which sulfuric acid is supported on zirconia, alumina or titania.

5. A production method for hydrogen peroxide according to claim 3 wherein the solid super acid consisting of metal oxides is molybdenum oxide supported on zirconia or tungsten oxide supported on zirconia.

6. A production method for hydrogen peroxide according to claim 1 wherein a solid acid carrier is employed, which a proton form of mordenite or a proton form of Type MFI zeolite.

7. A production method for hydrogen peroxide according to claim 1 wherein the promoter is a halogen containing compound which compound excludes compounds containing no halogen other than fluorine.

8. A production method for hydrogen peroxide according to claim 7 wherein the halogen containing compound of claim 7 is sodium bromate, sodium bromide, potassium bromide, ammonium bromide or ammonium chloride.

9. A production method for hydrogen peroxide according to claim 1 wherein the reaction medium is an aqueous solution containing a promoter.

10. A production method for hydrogen peroxide according to claim 1 wherein the reaction medium is an aqueous solution containing the promoter and a hydrogen peroxide stabilizer.

11. A production method for hydrogen peroxide according to claim 10 wherein the hydrogen peroxide stabilizer of claim 10 is one member selected from the group consisting of a sodium salt of aminotri(methylenephosphonic acid), 1-hydroxyethylidene-1, 1-diphosphonic acid, ethylenediaminetetra(methylenephosphonic acid), and sodium pyrophosphate.

12. A production method for hydrogen peroxide according to claim 1 wherein oxygen and hydrogen are reacted directly in the reaction medium containing a promoter in the presence of a catalyst in the presence or absence of a non-reactive gas at a temperature of between 0° C. and 50° C. and under a reaction pressure of between 3 kg./cm$^2$. G and 150 kg./cm$^2$. G.

13. A production method according to claim 1 wherein the platinum group metal is supported on a solid acid carrier with an acidity index of HO<−3.

14. A production method acccording to claim 1 wherein the platinum group metal is supported on a solid super acid carrier having an acidity index of HO<−11.

* * * * *